US009926779B2

(12) United States Patent
Sugiura

(10) Patent No.: US 9,926,779 B2
(45) Date of Patent: Mar. 27, 2018

(54) DOWNHOLE WHIRL DETECTION WHILE DRILLING

(71) Applicant: Schlumberger Technology Corporation, Sugar Land, TX (US)

(72) Inventor: Junichi Sugiura, Bristol (GB)

(73) Assignee: SCHLUMBERGER TECHNOLOGY CORPORATION, Sugar Land, TX (US)

( * ) Notice: Subject to any disclaimer, the term of this patent is extended or adjusted under 35 U.S.C. 154(b) by 1142 days.

(21) Appl. No.: 13/874,814

(22) Filed: May 1, 2013

(65) Prior Publication Data

US 2013/0248247 A1 Sep. 26, 2013

Related U.S. Application Data

(63) Continuation-in-part of application No. 13/293,944, filed on Nov. 10, 2011.

(60) Provisional application No. 61/806,897, filed on Mar. 31, 2013.

(51) Int. Cl.

| | |
|---|---|
| ***E21B 47/12*** | (2012.01) |
| ***G06F 19/00*** | (2011.01) |
| ***E21B 44/00*** | (2006.01) |

(52) U.S. Cl.

CPC .............. *E21B 47/12* (2013.01); *E21B 44/00* (2013.01); *G06F 19/00* (2013.01)

(58) Field of Classification Search

CPC .......... E21B 47/09; E21B 47/12; E21B 44/00; G06F 19/00

See application file for complete search history.

(56) References Cited

U.S. PATENT DOCUMENTS

| | | | |
|---|---|---|---|
| 3,525,406 | A | 8/1970 | Hart |
| 3,968,473 | A | 7/1976 | Patton et al. |
| 4,715,451 | A | 12/1987 | Bseisu et al. |
| 4,773,263 | A | 9/1988 | Lesage et al. |
| 4,903,245 | A | 2/1990 | Close et al. |
| 4,958,125 | A | 9/1990 | Jardine et al. |
| 5,226,332 | A | 7/1993 | Wassell |
| 5,265,682 | A | 11/1993 | Russell et al. |

(Continued)

FOREIGN PATENT DOCUMENTS

| | | | |
|---|---|---|---|
| GB | 2451100 | A | 1/2009 |
| WO | 1997015749 | A2 | 5/1997 |
| WO | 2000037764 | A2 | 6/2000 |

OTHER PUBLICATIONS

Brett, et al. "Bit Whirl: A New Theory of PDC Bit Failure," SPE 19571, 64th Annual Technical Conference and Exhibition of the Society of Petroleum Engineers held in San Antonio, TX, USA, Oct. 8-11, 1989, pp. 521-536.

(Continued)

*Primary Examiner* — Manuel Rivera Vargas
*Assistant Examiner* — Yaritza Perez Bermudez

(57) ABSTRACT

A method for making downhole whirl measurements in a drill string includes rotating a sensor set in a borehole. The sensor set is deployed in the drill string and includes at least one cross-axial accelerometer and at least one cross-axial magnetometer. Sensor measurements, including a plurality of accelerometer measurements and a plurality of magnetometer measurements made at predetermined measurement intervals, may be obtained while drilling and used to compute a whirl magnitude.

17 Claims, 6 Drawing Sheets

(56) References Cited

U.S. PATENT DOCUMENTS

| | | | |
|---|---|---|---|
| 5,313,829 | A | 5/1994 | Paslay et al. |
| 5,358,059 | A | 10/1994 | Ho |
| 5,448,227 | A | 9/1995 | Orban et al. |
| 5,448,911 | A | 9/1995 | Mason |
| 5,603,386 | A | 2/1997 | Webster |
| 5,721,376 | A | 2/1998 | Pavone et al. |
| 5,864,058 | A | 1/1999 | Chen |
| 6,065,332 | A | 5/2000 | Dominick |
| 6,068,394 | A | 5/2000 | Dublin, Jr. |
| 6,092,610 | A | 7/2000 | Kosmala et al. |
| 6,109,372 | A | 8/2000 | Dorel et al. |
| 6,216,802 | B1 | 4/2001 | Sawyer |
| 6,233,524 | B1 | 5/2001 | Harrell et al. |
| 6,267,185 | B1 | 7/2001 | Mougel et al. |
| 6,268,726 | B1 | 7/2001 | Prammer et al. |
| 6,427,783 | B2 | 8/2002 | Krueger et al. |
| 6,453,239 | B1 | 9/2002 | Shirasaka et al. |
| 6,518,756 | B1 | 2/2003 | Morys et al. |
| 6,581,699 | B1 | 6/2003 | Chen et al. |
| 6,608,565 | B1 | 8/2003 | Van Steenwyk et al. |
| 6,681,633 | B2 | 1/2004 | Schult et al. |
| 6,742,604 | B2 | 6/2004 | Brazil et al. |
| 7,114,578 | B2 * | 10/2006 | Hutchinson ............. E21B 47/04 175/39 |
| 7,222,681 | B2 | 5/2007 | Jones et al. |
| 7,414,405 | B2 | 8/2008 | Moore |
| 7,426,967 | B2 | 9/2008 | Sugiura |
| 7,571,643 | B2 * | 8/2009 | Sugiura ................... E21B 7/062 73/152.46 |
| 8,589,136 | B2 * | 11/2013 | Ertas ......................... E21B 7/00 166/369 |
| 2001/0045300 | A1 | 11/2001 | Fincher et al. |
| 2002/0124652 | A1 | 9/2002 | Schultz et al. |
| 2004/0206170 | A1 | 10/2004 | Chen et al. |
| 2004/0222019 | A1 | 11/2004 | Estes et al. |
| 2004/0251898 | A1 | 12/2004 | Morys et al. |
| 2005/0001624 | A1 | 1/2005 | Ritter et al. |
| 2005/0001737 | A1 | 1/2005 | Baron et al. |
| 2005/0034985 | A1 | 2/2005 | Zamanzadeh et al. |
| 2005/0071120 | A1 | 3/2005 | Hutchinson |
| 2005/0132794 | A1 | 6/2005 | Spross et al. |
| 2005/0150694 | A1 | 7/2005 | Schuh |
| 2006/0195265 | A1 | 8/2006 | Schen et al. |
| 2007/0107937 | A1 | 5/2007 | Sugiura |
| 2007/0289373 | A1 | 12/2007 | Sugiura |
| 2009/0065262 | A1 | 3/2009 | Downton et al. |
| 2010/0082256 | A1 | 4/2010 | Mauldin et al. |
| 2011/0147083 | A1 | 6/2011 | Maudlin et al. |
| 2011/0186353 | A1 | 8/2011 | Turner et al. |
| 2012/0062235 | A1 | 3/2012 | Khan et al. |
| 2012/0222900 | A1 | 9/2012 | Rodney |
| 2013/0124095 | A1 | 5/2013 | Sugiura |

OTHER PUBLICATIONS

Chen, et al. "Field Investigation of the Effects of Stick-Slip, Lateral, and Whirl Vibrations on Roller Cone Bit Performance," SPE 56439, SPE Annual Technical Conference and Exhibition; Houston, Texas; Oct. 3-6, 1999, pp. 1-10.

International Search Report and the Written Opinion for International Application No. PCT/US2014/032042 dated Aug. 7, 2014.

Pavone, et al. "Application of High Sampling Rate Downhole Measurements for Analysis and Cure of Stick-Slip in Drilling," SPE 28324, SPE 69th Annual Technical Conference and Exhibition; New Orleans, LA, USA; Sep. 25-28, 1994, pp. 335-345.

Sugiura, et al. "Integrated Approach to Rotary-Steerable Drilling Optimization Using Concurrent Real-Time Measurement of Near-Bit Borehole Caliper and Near-Bit Vibration," SPE 112163, SPE Intelligent Energy Conference and Exhibition; Amsterdam, The Netherlands; Feb. 25-27, 2008, pp. 1-19.

Sugiura "The Use of the Near-bit Vibration Sensor While Drilling Leads to Optimized Rotary-Steerable Drilling in Push-and Point-the-Bit Configurations," SPE 115572, SPE Asia Pacific Oil & Gas Conference and Exhibition; Perth, Australia; Oct. 20-22, 2008, pp. 1-10.

Zannoni, et al. "Development and Field Testing of a New Downhole MWD Drillstring Dynamics Sensor," SPE 26341, 68th Annual Technical Conference and Exhibition of the Society of Petroleum Engineers; Houston, Texas; Oct. 30, 1993, pp. 269-283.

Extended European Search Report issued in EP application 12848215.5 dated Dec. 2, 2015, 8 pages.

Examination Report issued in CA application 2855292 dated Apr. 5, 2016, 6 pages.

International Search Report and Written Opinion issued in PCT/US2012/064314 dated Feb. 28, 2013, 12 pages.

International Preliminary Report on Patentability issued in PCT application PCT/US2012/064314 dated May 22, 2014, 9 pages.

Examination Report issued in CA application 2855292 dated Jun. 9, 2015, 4 pages.

Non-Final Office Action issued in U.S. Appl. No. 13/293,944 dated Jan. 15, 2015. 13 pages.

Final Office Action issued in U.S. Appl. No. 13/293,944 dated Jul. 22, 2015. 14 pages.

Examination Report 94(3) EPC issued in EP application 12848215.5 dated Mar. 2, 2017. 4 pages.

International Preliminary Report on Patentability issued in PCT application PCT/US2014/032042 dated Oct. 15, 2015. 12 pages.

Examination Report 94(3) EPC issued in EP application 14778107.4 dated Nov. 7, 2016. 5 pages.

European Search Report (R. 61 or R. 63) issued in EP application 14778107.4 dated Oct. 19, 2016. 3 pages.

* cited by examiner

DOWNHOLE WHIRL DETECTION WHILE DRILLING

CROSS REFERENCE TO RELATED APPLICATIONS

This application claims the benefit of U.S. Provisional Application Ser. No. 61/806,897, entitled Real-time Whirl Detection Using An RSS/MWD/LWD Imaging Tool, filed Mar. 31, 2013. The present application is also a continuation-in-part of co-pending, commonly-assigned U.S. patent application Ser. No. 13/293,944 entitled Downhole Dynamics Measurements Using Rotating Navigation Sensors, filed Nov. 10, 2011.

FIELD OF THE INVENTION

Disclosed embodiments relate generally to dynamics measurements made while drilling and more particularly to a method for detecting and quantifying bit whirl while drilling.

BACKGROUND

It is well known in the art that severe dynamic conditions are sometimes encountered during drilling. Commonly encountered dynamic conditions include, for example, axial vibration, lateral shock and vibration, torsional vibration, stick/slip, and whirl. Bit bounce includes axial vibration of the drill string, sometimes resulting in temporary lift off of the drill bit from the formation ("bouncing" of the drill bit off the bottom of the borehole). Axial vibrations (e.g., bit bounce) is known to reduce the rate of penetration (ROP) during drilling, may cause excessive fatigue damage to BHA components, and may even damage the well in extreme conditions.

Lateral vibrations are those which are transverse to the axis of the drill string (cross-axial). Such lateral vibrations are commonly recognized as a leading cause of drill string, drill string connection, and BHA failures and may be caused, for example, by bit whirl and/or the use of unbalanced drill string components.

Stick/slip refers to a torsional vibration induced by friction between drill string components and the borehole wall. Stick/slip is known to produce instantaneous drill string rotation speeds many times that of the nominal rotation speed of the table. In stick/slip conditions a portion of the drill string or bit sticks to the borehole wall due to frictional forces often causing the drill string to temporarily stop rotating. Meanwhile, the rotary table continues to turn resulting in an accumulation of torsional energy in the drill string. When the torsional energy exceeds the static friction between the drill string and the borehole, the energy is released suddenly in a rapid burst of drill string rotation. Instantaneous downhole rotation rotates have been reported to exceed four to ten times that of the rotary table. Stick/slip is known to cause severe damage to downhole tools, as well as connection fatigue, and excess wear to the drill bit and near-bit stabilizer blades. Such wear commonly results in reduced ROP and loss of steerability in deviated boreholes.

Bit or stabilizer whirl may be caused by the instantaneous center of rotation moving around the face of the bit (or about the axis of the string). The movement (rotation of the whirl) is generally in the opposite direction of the rotation of the drill string (counterclockwise vs. clockwise). Cutting elements on a whirling bit have been documented to move sideways, backwards, and at much higher velocities than those on a non-whirling bit. The associated impact loads are known to cause chipping and accelerated wear of the bit components. For example, severe bit damage has been observed even after very short duration drilling operations for polycrystalline diamond compact (PDC) bits.

These harmful dynamic conditions not only cause premature failure and excessive wear of the drilling components, but also can result in costly trips (tripping-in and tripping-out of the borehole) due to unexpected tool failures and wear. Furthermore, there is a trend in the industry towards drilling deeper, smaller diameter wells where damaging dynamic conditions can become increasingly problematic. Problems associated with premature tool failure and wear are exacerbated (and more expensive) in such wells.

The above-described downhole dynamic conditions are known to be influenced by drilling parameters. By controlling such drilling parameters an operator can sometimes mitigate against damaging dynamic conditions. For example, bit bounce and lateral vibration conditions can sometimes be overcome by reducing both the weight on bit and the drill string rotation rate. Stick/slip conditions can often be overcome via increasing the drill string rotation rate and reducing weight on bit. The use of less aggressive drill bits also tends to reduce bit bounce, lateral vibrations, and stick/slip in many types of formations. The use of stiffer drill string components is further known to sometimes reduce stick/slip. While the damaging dynamic conditions may often be mitigated as described above, reliable measurement and identification of such dynamic conditions can be problematic. For example, lateral vibration and stick/slip conditions are not easily quantified by surface measurements. In fact, such dynamic conditions are sometimes not even detectable at the surface, especially at vibration frequencies above about 5 hertz.

Downhole dynamics measurement systems have been known in the art for at least 15 years. While these, and other known systems and methods, may be serviceable in certain applications, there is yet need for further improvement. For example, known systems typically make use of dedicated sensors which tends to increase costs and expend valuable BHA real estate (e.g., via the introduction of a dedicated dynamics measurement sub). Also, such dedicated sensors tend to increase power consumption and component counts and, therefore, the complexity of MWD, LWD, and directional drilling tools, and thus tend to reduce reliability of the system. Moreover, dedicated sensors must typically be deployed a significant distance above the drill bit.

Therefore there exists a need for an improved method for making downhole dynamics measurements and particularly for making such measurements as close to the drill bit as possible.

SUMMARY

A method for making downhole whirl measurements (such as bit whirl measurements) in a drill string is disclosed. The method includes rotating a downhole sensor set in a borehole. The sensor set is deployed in the drill string and includes at least first and second cross-axial accelerometer and first and second cross-axial magnetometers. The sensors used to obtain sensor measurements including a plurality of accelerometer measurements and a plurality of magnetometer measurements at predetermined measurement intervals. The sensor measurements are then processed in combination with a predetermined blade count to obtain a whirl magnitude. The sensor measurements may be processed to obtain a rotation rate of the drill string, which may be in turn further processed in combination with a stabilizer or drill bit blade count to obtain a whirl frequency. The sensor measurements may then be processed in combination with the whirl frequency to obtain the whirl magnitude.

The disclosed embodiments may provide various technical advantages. For example, the disclosed method may make use of existing accelerometer and magnetometer sensor sets to obtain whirl frequency and magnitude parameters while drilling. Moreover, the sensors may be deployed very close to the drill bit enabling the acquisition of bit whirl parameters (such as bit whirl magnitude). Measuring the bit whirl magnitude while drilling may enable an operator to prevent damage to the drill string. For example, drill string rotation rate and weight on bit may be controlled at the surface in a closed loop fashion to automatically mitigate harmful vibrations.

This summary is provided to introduce a selection of concepts that are further described below in the detailed description. This summary is not intended to identify key or essential features of the claimed subject matter, nor is it intended to be used as an aid in limiting the scope of the claimed subject matter.

BRIEF DESCRIPTION OF THE DRAWINGS

For a more complete understanding of the disclosed subject matter, and advantages thereof, reference is now made to the following descriptions taken in conjunction with the accompanying drawings, in which:

FIG. 6 depicts a flow chart of an example method embodiment for

DETAILED DESCRIPTION

Figure 1:
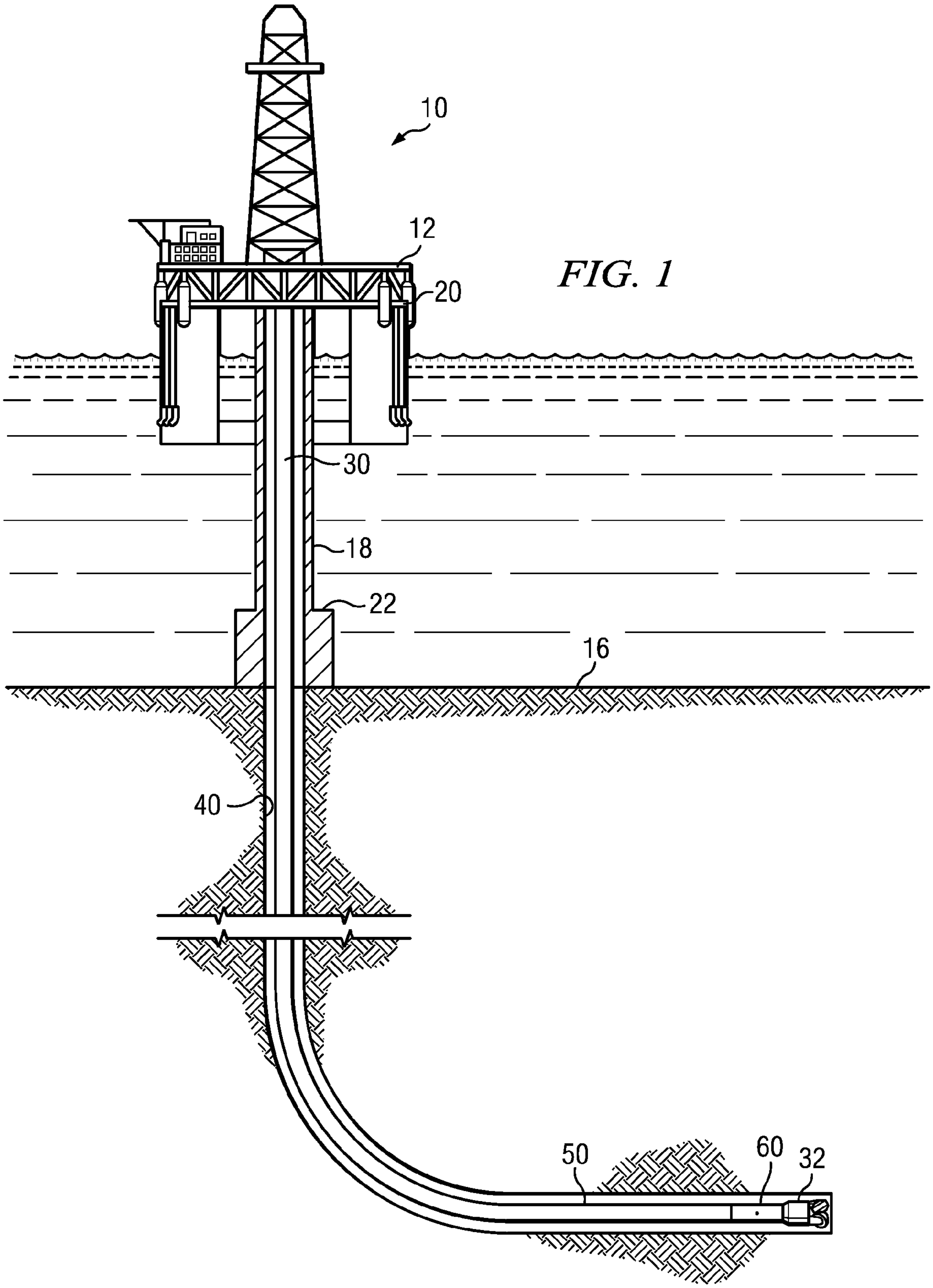
FIG. 1 depicts one example of a conventional drilling rig on which disclosed methods may be utilized.

FIG. 1 depicts an example drilling rig 10 suitable for using various method embodiments disclosed herein. A semisubmersible drilling platform 12 is positioned over an oil or gas formation (not shown) disposed below the sea floor 16. A subsea conduit 18 extends from deck 20 of platform 12 to a wellhead installation 22. The platform may include a derrick and a hoisting apparatus for raising and lowering a drill string 30, which, as shown, extends into borehole 40 and includes a drill bit 32 and a near-bit sensor sub 60 (such as the iPZIG® tool available from PathFinder®, A Schlumberger Company, Katy, Tex., USA). Drill string 30 may further include a downhole drilling motor, a steering tool such as a rotary steerable tool, a downhole telemetry system, and one or more MWD or LWD tools including various sensors for sensing downhole characteristics of the borehole and the surrounding formation. The disclosed embodiments are not limited in these regards.

It will be understood by those of ordinary skill in the art that the deployment illustrated on FIG. 1 is merely an example. It will be further understood that disclosed embodiments are not limited to use with a semisubmersible platform 12 as illustrated on FIG. 1. The disclosed embodiments are equally well suited for use with any kind of subterranean drilling operation, either offshore or onshore.

Figure 2:
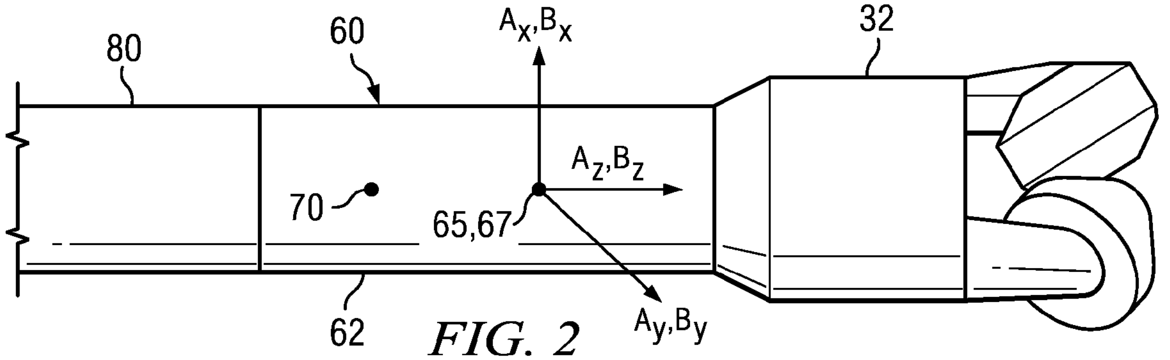
FIG. 2 depicts a lower BHA portion of the drill string shown on FIG. 1.

FIG. 2 depicts the lower BHA portion of drill string 30 including drill bit 32, a near-bit sensor sub 60, and a lower portion of a steering tool 80. In the depicted embodiment, sensor sub body 62 is threadably connected with the drill bit 32 and therefore configured to rotate with the drill bit 32. The sensor sub 60 includes tri-axial accelerometer 65 and magnetometer 67 navigation sensors and may optionally further include a logging while drilling sensor 70 such as a natural gamma ray sensor. In the depicted embodiment, the sensors 65 and 67 may be deployed as closed to the bit 32 as possible, for example, within two meters, or even within one meter, of the bit 32.

Suitable accelerometers for use in sensors 65 and 67 may be chosen from among substantially any suitable commercially available devices known in the art. For example, suitable accelerometers may include Part Number 979-0273-001 commercially available from Honeywell, and Part Number JA-5H175-1 commercially available from Japan Aviation Electronics Industry, Ltd. (JAE). Suitable accelerometers may alternatively include micro-electro-mechanical systems (MEMS) solid-state accelerometers, available, for example, from Analog Devices, Inc. (Norwood, Mass.). Such MEMS accelerometers may be advantageous for certain near bit sensor sub applications since they tend to be shock resistant, high-temperature rated, and inexpensive. Suitable magnetic field sensors may include conventional three-axis ring core flux gate magnetometers or conventional magnetoresistive sensors, for example, Part Number HMC-1021D, available from Honeywell.

FIG. 2 further includes a diagrammatic representation of the tri-axial accelerometer and magnetometer sensor sets 65 and 67. By tri-axial it is meant that each sensor set includes three mutually perpendicular sensors, the accelerometers being designated as $A_x$, $A_y$, and $A_z$ and the magnetometers being designated as $B_x$, $B_y$, and $B_z$. By convention, the z-axis accelerometer and magnetometer ($A_z$ and $B_z$) are oriented substantially parallel with the borehole as indicated (although disclosed embodiments are not limited in this regard). Each of the accelerometer and magnetometer sets may therefore be considered as determining a plane (the x and y-axes) and a pole (the z-axis along the axis of the BHA).

The accelerometer and magnetometer sets may be configured for making downhole navigational (surveying) measurements during a drilling operation. Such measurements are well known and commonly used to determine, for example, borehole inclination, borehole azimuth, gravity toolface, and magnetic toolface. Being configured for making navigational measurements, the accelerometer and magnetometer sets 65 and 67 are rotationally coupled to the drill bit 32 (e.g., rotationally fixed to the sub body 62 which rotates with the drill bit). The accelerometers may also be electronically coupled to a digital controller via a low-pass filter (including an anti-aliasing filter) arrangement. Such "DC coupling" is generally desirable for making accelerometer based surveying measurements (e.g., borehole inclination or gravity toolface measurements). The use of a low-pass filter band-limits sensor noise (including noise caused by sensor vibration) and therefore tends to improve sensor resolution and surveying accuracy.

Figure 3:
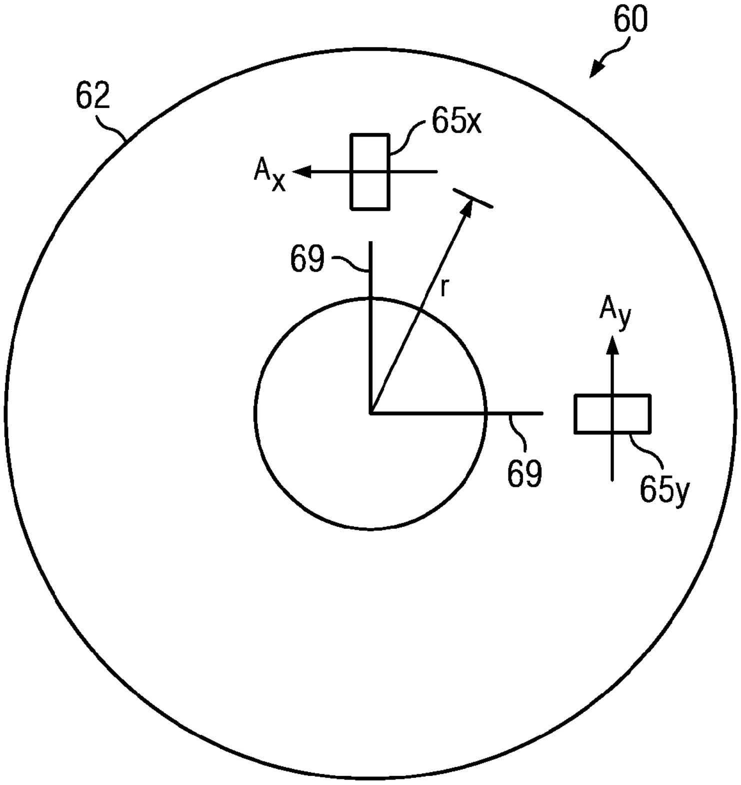
FIG. 3 depicts a circular cross section of an accelerometer arrangement deployed in the lower BHA shown on FIG. 2.

FIG. 3 depicts a circular cross sectional view of one example accelerometer arrangement in sensor sub 60. In the depicted embodiment, the x-axis and y-axis accelerometers 65*x* and 65*y* are circumferentially spaced apart from one another by about 90 degrees. The z-axis accelerometer is not depicted and may be deployed substantially anywhere in the sub body 62. The accelerometers 65*x* and 65*y* may each be aligned with a radial direction 69 such that each accelerometer is substantially insensitive to centripetal acceleration (i.e., the radially directed acceleration caused by a uniform rotation of the sub body 62). The accelerometers remain sensitive to tangential acceleration (i.e., acceleration caused by non-uniform rotation of the sub body 62). The arrangement therefore remains sensitive to stick/slip (torsional vibration) conditions. It will be understood that the disclosed method embodiments are not limited to use with the depicted accelerometer arrangement. For example, accelerometers 65*x* and 65*y* may be deployed at substantially the same location in the tool body 62. The accelerometers 65*x* and 65*y* may alternatively be aligned with a tangential direction such that they are substantially insensitive to tangential acceleration and sensitive to centripetal (radial) acceleration.

Figure 4:
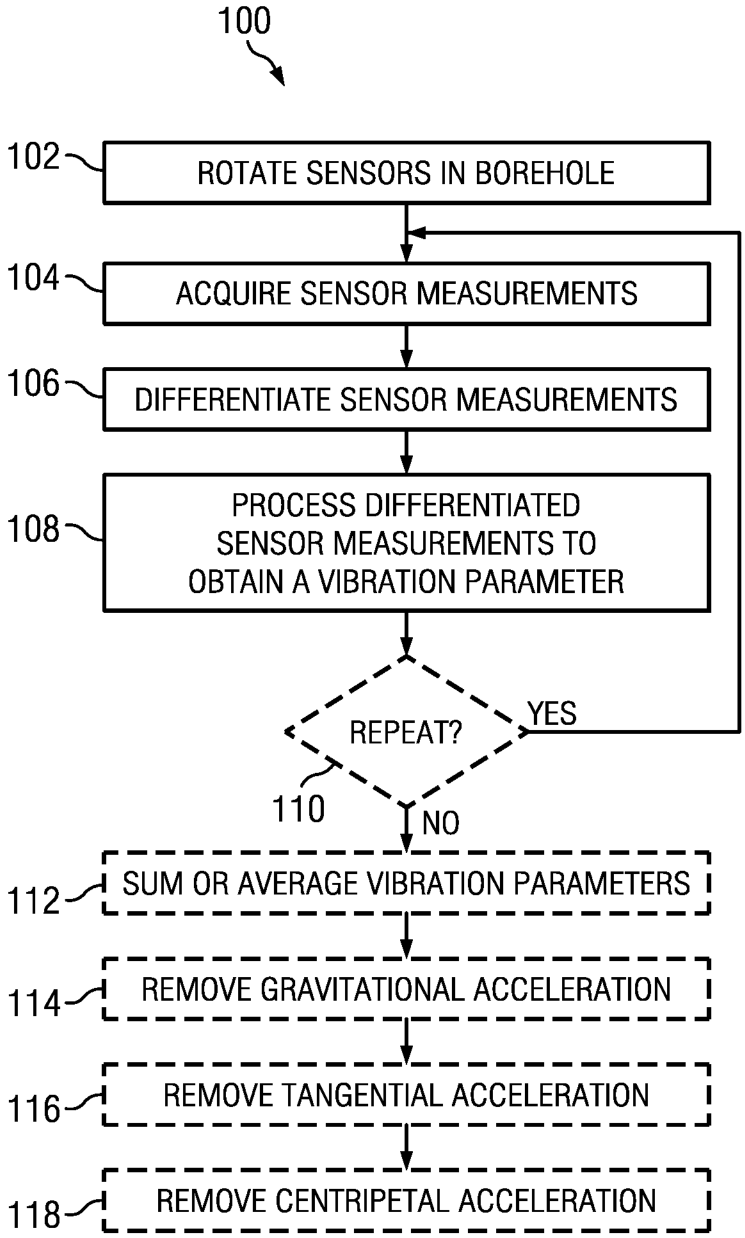
FIG. 4 depicts a flow chart of one disclosed method embodiment.

FIG. 4 depicts a flow chart of one example of a method 100 for making downhole dynamics measurements with rotating navigational sensors. Navigational sensors are rotated in a borehole at 102, for example, while drilling the borehole (by either rotating the drill string at the surface or rotating the drill bit with a conventional mud motor). Conventionally, the x- and y-axis navigation sensor data are unused while the sensors are rotated (e.g., drill string or drill bit rotation during drilling). The navigational sensors may include a tri-axial accelerometer set and a tri-axial magnetometer set as described above with respect to FIGS. 2 and 3. Moreover, the sensors may be deployed as close to the bit as possible, for example, in a near-bit sensor sub as is also described above with respect to FIGS. 2 and 3.

Accelerometer measurements are made at a predetermined time interval at 104 while rotating in 102 (e.g., during the actual drilling process) to obtain a set (or array) of accelerometer measurements. The accelerometer measurements may then be digitally (numerically) differentiated at 106 to remove a DC component of the acceleration and obtain a set of differentiated accelerometer measurements (i.e., acceleration differences). Maximum and minimum difference values obtained over some time period or number of difference samples may then be processed at 108 to obtain a drill string vibration parameter. This process may be optionally repeated substantially any number of times at 110 to obtain an averaged difference value at 112. This averaged value may then be taken as an indication of lateral or axial vibration as is described in more detail below.

It will be appreciated by those of ordinary skill in the art that the accelerometer measurements obtained at 104 commonly include numerous acceleration components. For example, depending on the drilling conditions and the accelerometer configuration, such measurements may include: (i) a gravitational acceleration component due to the gravitational field of the earth, (ii) a centripetal acceleration component due to the rotational speed of the sensor sub body, (iii) a tangential acceleration component due to the rotational acceleration of the sensor sub body, and (iv) one or more vibrational components due to lateral and/or axial vibration of the drill string. Components (i), (ii), and (iii) may be considered as unwanted noise in applications in which the accelerometer measurements are being used as an indicator of lateral and/or axial vibration. In certain embodiments, it may therefore be advantageous to remove one or more of the non-vibrational components of the accelerometer measurements. For example only, method 100 may further optionally include the removal of any one, two, or all three of the following: (i) a gravitational acceleration component at 114, (ii) a tangential acceleration component at 116, and/or (iii) a centripetal acceleration component at 118 (since these accelerations may register in the x-, y- and/or z-axis accelerometers and be taken to be the result of lateral vibration).

With continued reference to FIG. 4, the accelerometer measurements made at 104 may be made at a rapid interval so as to be sensitive to drill string vibration. The interval may be in the range from about 0.0001 to about 0.1 second (i.e., a measurement frequency in the range from about 10 to about 10,000 Hz). For example, in one embodiment a measurement interval of 10 milliseconds (0.01 second) may be successfully utilized. These accelerometer measurements may then be numerically differentiated at 106, for example, as follows:

$$Ai_d = Ai(n) - Ai(n-1) \qquad \text{Equation 1}$$

where $Ai_d$ represents the differentiated accelerometer measurements (i.e., a difference between sequential acceleration measurements), Ai represents a measured acceleration value made along the i-axis (i being representative of the x-, y-, and/or z-axis), and n represents the array index in the set of accelerometer measurements such that Ai(n−1) and Ai(n) represent sequential accelerometer measurements. It will be understood that the differentiation may be performed one measurement point at a time (i.e., as each data point is acquired) or as a set of measurements after a predetermined number of measurements has been acquired. The disclosed methods are not limited in these regards.

The differentiated accelerometer measurements may then be processed to obtain a vibration parameter at 108, for example, by computing a difference between the maximum and minimum values of the differentiated accelerometer measurements, for example, as follows:

$$Ai_\Delta = \max Ai_d - \min Ai_d \approx 2\max Ai_d \qquad \text{Equation 2}$$

where $Ai_\Delta$ represents the vibration parameter and max $Ai_d$ and min $Ai_d$ represent the maximum and minimum differentiated acceleration values over a predetermined time period or for a predetermined number of samples (e.g., as determined in Equation 1). It will be understood that the differentiated accelerometer measurements (e.g., from Equation 1) may be integrated and smoothed prior to computing the difference in Equation 2. Such sub-sampling may enable the vibration severity to be evaluated at substantially any suitable frequency. In the embodiments described above, the original sampling rate is 100 samples per second. By integration, the differentiated data may be sub-sampled at substantially any other suitable frequency, for example, including 10 or 50 samples per second. The sub-sampled data may then be evaluated so as to monitor the vibration severities at predetermined frequencies (i.e., at other measurement intervals).

In one suitable embodiment, a measurement interval of 10 milliseconds and a time period of 1 second are utilized such that the set of acceleration differences determined in Equation 1 includes 100 raw differentiated acceleration values. The maximum and minimum values of the set may then be used to compute a vibration parameter in Equation 2. This process of differentiating the accelerometer measurements over a predetermined time period (e.g., 1 second) may then be repeated substantially any suitable number of times to obtain a corresponding set of vibration parameters at 110. In one embodiment, ten sequential vibration parameters may be averaged (or summed) to obtain a single vibration parameter which is indicative of the drill string vibration within a 10 second time window (i.e., over 10 one-second time periods). A smoothing algorithm may alternatively be utilized in which the vibration parameters may be averaged (or summed) with predetermined nearest neighbors to determine a vibration parameter which is indicative of the drill string vibration within a one-second time window. Such smoothing may be advantageous for computing vibration severities that may be transmitted in real-time to the surface thereby enabling the driller to change certain drilling parameters if necessary and to observe the effects of such changes (e.g., to drill string rotation rate, weight on bit, drilling fluid flow rate, etc.). The disclosed methods are not limited in regard to such averaging or smoothing techniques. The parameter obtained directly from Equation 2 (with no averaging or smoothing) may likewise be utilized.

Removal of various non-vibration acceleration components may be advantageous in certain embodiments so as to isolate the vibrational component(s) and to obtain a corrected vibration parameter. For example, a gravitational acceleration component may be optionally removed at 114 from the vibration parameter determined in Equation 2 as follows:

$$Vi_\Delta = Ai_\Delta - Gi_\Delta \quad \text{Equation 3}$$

where $Vi_\Delta$ represents the corrected vibration parameter, $Gi_\Delta$ represents a gravitational acceleration component, and $Ai_\Delta$ represents the vibration parameter described above with respect to Equation 2.

Figure 5A:
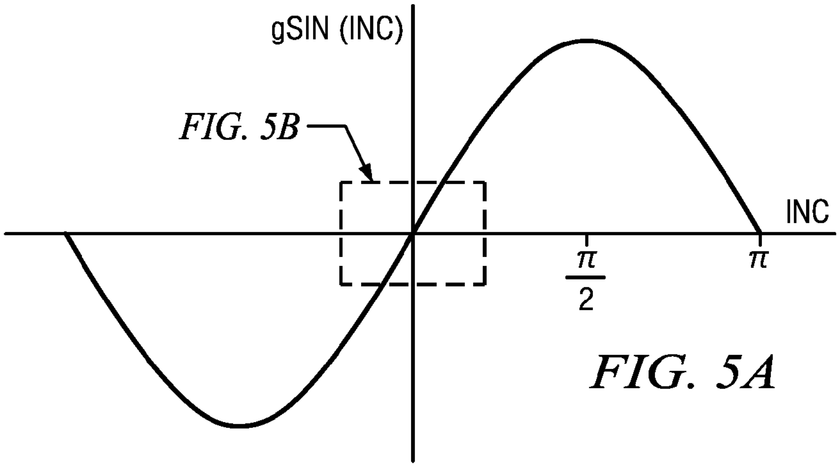
FIGS. 5A and 5B depict a plot of gravitational acceleration versus toolface angle of the sensor sub.
Figure 5B:
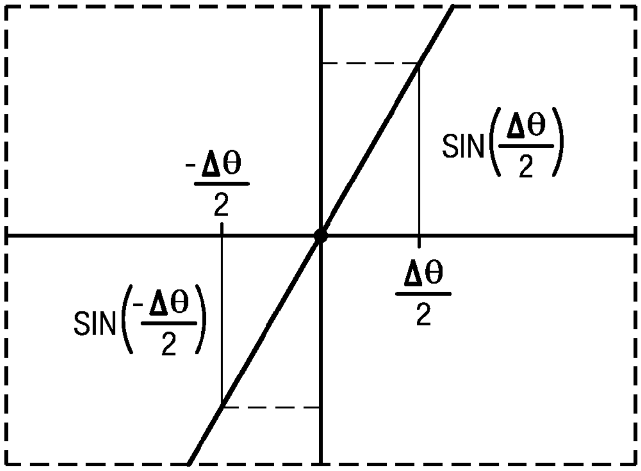

FIGS. 5A and 5B depict one methodology for determining $Gi_{66}$ . As depicted on FIG. 5A, the instantaneous gravitational acceleration as well as the differentiated gravitational acceleration Gi at the sensor set is mathematically related to the borehole inclination (Inc) and the toolface angle of the accelerometer (θ). Following the methodology of Equations 1 and 2, the gravitational acceleration component may be expressed mathematically, for example, as follows:

$$Gi_\Delta = \max Gi_d - \min Gi_d \approx 2\max Gi_d \quad \text{Equation 4}$$

where max $Gi_d$ and min $Gi_d$ represent the maximum and minimum differentiated gravitational acceleration values. It is well known that the maximum slope of a sine wave is located at the zero crossing as indicated in FIG. 5B. The maximum differentiated gravitational acceleration may be represented mathematically, for example, as follows:

$$\max Gi_d = g\,\sin(\mathrm{Inc})[\sin(\Delta\theta/2) - \sin(-\Delta\theta/2)] \quad \text{Equation 5}$$

where Δθ represents the toolface angle change over the predetermined measurement interval described above (e.g., the change in toolface angle over a 10 millisecond interval between sequential accelerometer measurements), g represents the gravitational acceleration of the earth (which is well known to be approximately 9.8 m/sec$^2$), and Inc represents the borehole inclination. Substituting Equation 5 into Equation 4 and recognizing that sin θ=θ for small angles and that Δθ=2π·t·R/60, where t represents the predetermined measurement interval in units of seconds and R represents the rotational velocity of the accelerometer in units of RPM, yields:

$$Gi_\Delta = \frac{\pi}{15} Rtg|\sin(Inc)| \quad \text{Equation 6}$$

where i represents one of the cross-axial axes (i.e., x- or the y-axis). Note that the cross-axial gravitational acceleration component is a maximum in a horizontal well (90 degree inclination) and near zero in a vertical well (zero degree inclination). The axial gravitational acceleration component is described in more detail below.

As indicated in Equation 6, the gravitational acceleration component may be removed from the vibration parameter to obtain a corrected vibration parameter when the borehole inclination and rotation rate of the sensor are known. As is well known in the art, the borehole inclination may be obtained from the accelerometer measurements, for example, according to one of the following equations:

$$\tan(Inc) = \frac{Az}{\sqrt{Ax^2 + Ay^2}} \quad \text{Equation 7}$$

$$\cos(Inc) = \frac{Az}{mag(G)}$$

where Ax, Ay, and Az represents the measured tri-axial acceleration values as described above and mag(G) represents the magnitude of the earth's gravitational field. The magnitude of the earth's gravitation field may obtained from geological surveys, measured on site, or determined from the accelerometer measurements, e.g., via $magG=\sqrt{(Ax^2+Ay^2+Az^2)}$. The rotation rate of the sensor sub may also be obtained from the accelerometer measurements but is generally obtained from substantially simultaneous magnetometer measurements, for example, as follows:

$$R = \frac{30}{\pi}\omega = \frac{30}{\pi}\left[\frac{\theta_m(n) - \theta_m(n-1)}{t}\right] \quad \text{Equation 8}$$

where R represents the rotation rate in units of RPM, ω represents the angular velocity in units of radians per second, $\theta_m$ represents the magnetic toolface, t represents the predetermined measurement interval, and n represents the array index in the set of magnetic toolface measurements such that $\theta_m(n-1)$ and $\theta_m(n)$ represent sequential magnetic toolface measurements. Those of ordinary skill in the art will readily appreciate that $\tan\theta_m = My/Mx$ where Mx and My represent the x-axis and y-axis magnetometer measurements. Those of ordinary skill will also be readily able to re-write Equation 8 such that the rotation rate is expressed in alternative units such as in radians per second or degrees per second (the disclosed embodiments are not limited in these regards). Equation 8 may also be written with respect to accelerometer based toolface measurements in which $\tan\theta_a = Ay/Ax$. Moreover, gravity toolface and magnetic toolface may be computed from one another by adding (or subtracting) the angle difference between them, where the angle difference may be computed, for example from a conventional static survey.

With reference again to FIG. 4, the tangential acceleration component may be optionally removed from the vibration parameter at 116 to obtain a corrected vibration parameter, for example, as follows:

$$Vi_\Delta = Ai_\Delta - Ti_\Delta \quad \text{Equation 9}$$

where $Vi_\Delta$ represents the corrected vibration parameter, $Ti_\Delta$ represents the tangential acceleration component, and $Ai_\Delta$ represents the vibration parameter described above with respect to Equation 2. In Equations 9-14, i represents one of the cross-axial axes (i.e., x- or the y-axis) as there is generally minimal z-axis (axial) tangential or centripetal acceleration. Tangential acceleration is related to the angular acceleration (i.e., the rate of change of the rotation rate) of the sensor (the accelerometer) and may be expressed mathematically, for example, as follows:

$$Ti = r\alpha = r\left[\frac{\omega(n) - \omega(n-1)}{t}\right] \quad \text{Equation 10}$$

where Ti represents a substantially instantaneous tangential acceleration, r represents the radial distance between the accelerometer and the center of the sensor sub (i.e., the radius), α represents the angular acceleration of the sensor, ω represents the angular velocity of the sensor, t represents the predetermined measurement interval, and n represents the array index in the set of angular velocity measurements such that ω(n−1) and ω(n) represent sequential angular velocity measurements. The angular velocity ω may be obtained by differentiating the magnetic toolface measurements, for example, as shown below in Equations 13 and 19. Following the methodology of Equations 1 and 2, a tangential acceleration component $Ti_\Delta$ may be expressed mathematically, for example, as follows:

$$Ti_\Delta = \max Ti - \min Ti \approx 2\max Ti \quad \text{Equation 11}$$

where max Ti and min Ti represent the maximum and minimum instantaneous tangential accelerations within a set of measurements (made for example within a predetermined time period).

With continued reference to FIG. 4, a centripetal acceleration component may be optionally removed from the vibration parameter at 118, for example, as follows:

$$Vi_\Delta = Ai_\Delta - Ci_\Delta \quad \text{Equation 12}$$

where $Vi_\Delta$ represents the corrected vibration parameter, $Ci_\Delta$ represents the centripetal acceleration component, and $Ai_\Delta$ represents the vibration parameter as described above in Equation 2. When utilizing an accelerometer arrangement such as that depicted on FIG. 3, the measured centripetal acceleration tends to be near zero, however, removal of the centripetal acceleration component may be advantageous when utilizing alternative accelerometer arrangements. Centripetal acceleration is related to the angular velocity (i.e., the rotation rate) of the sensor sub and may be expressed mathematically, for example, as follows:

$$Ci = r\omega^2 = r\left[\frac{\theta_m(n) - \theta_m(n-1)}{t}\right]^2 \quad \text{Equation 13}$$

where Ci represents a substantially instantaneous centripetal acceleration, r represents the radial distance between the accelerometer and the center of the sensor sub (i.e., the radius), ω represents the angular velocity of the sensor, $\theta_m$ represents the magnetic toolface of the sensor, t represents the predetermined measurement interval, and n represents the array index in the set of magnetic toolface measurements such that $\theta_m(n-1)$ and $\theta_m(n)$ represent sequential magnetic toolface measurements. Following the methodology of Equations 1 and 2, the centripetal acceleration component $Cx_\Delta$ may be expressed mathematically, for example, as follows:

$$Ci_\Delta = \max Ci - \min Ci \quad \text{Equation 14}$$

where max Ci and min Ci represent the maximum and minimum instantaneous centripetal accelerations within a set of measurements (made for example within a predetermined time period). Those of ordinary skill in the art will readily appreciate that Equations 8, 10, and 13 may be equivalently expressed in terms of angular acceleration and angular velocity vectors $\vec{\alpha}$ and $\vec{\omega}$ (the disclosed embodiments are not limited in this regard).

It will be understood that tangential and centripetal accelerations are primarily sensed by the cross-axial accelerometers (i.e., the x- and y-axis accelerometers) while the axial accelerometer (the z-axis accelerometer) tends to be insensitive tangential and centripetal accelerations. However, misalignment of the accelerometers with the previously defined tool coordinate system can result in significant tangential and centripetal accelerations being sensed by all three accelerometers.

It will further be understood that the vibration parameter corrections described above with respect to Equations 3-14 may make use of substantially simultaneous magnetic field measurements. For example, substantially instantaneous magnetic toolface measurements may be computed from magnetic field measurements made at the predetermined time interval (e.g., via $\tan\theta_m = My/Mx$ where Mx and My represent the x-axis and y-axis magnetometer measurements). The magnetic toolface may be differentiated as given in Equation 19 to obtain substantially instantaneous angular velocities which may in turn be further differentiated as shown in Equation 10 to obtain substantially instantaneous angular accelerations. It will further be understood that the accelerometer and magnetometer sensors commonly include hardware low-pass filters (as described above). These filters may have different cut-off frequencies and phase responses. In general, accelerometers have lower cut-off frequencies as their measurements are more sensitive to shock and vibration. Notwithstanding, such hardware filter characteristics difference may be compensated digitally using techniques known to those of ordinary skill in the art.

In one example of the disclosed method embodiments, a lateral vibration parameter may be obtained via combining both cross-axial accelerometer measurements (the x-axis and y-axis accelerometers). The combined lateral vibration parameter may be computed, for example, as follows:

$$Vxy = \sqrt{Vx^2 + Vy^2} \quad \text{Equation 15}$$

where Vxy represents the combined lateral vibration parameter and Vx and Vy represent the cross-axial lateral vibration parameters computed, for example, via one of Equations 2, 3, 9, or 12 using corresponding x- and y-axis accelerometer measurements. Also, by analyzing the sign (vibration direction) of both x-axis and y-axis vibrations (Vxy), the type of lateral vibration (e.g. forward whirl, backward whirl, chaotic whirl etc.) and the movement of drillstring, stabilizer, and bit (depending on sensor position) may be identified.

In another example, an axial vibration parameter may be readily obtained using the axial (z-axis) accelerometer, for example, via Equation 2 or 3. The z-axis accelerometer is not generally sensitive to tangential or centripetal accelerations as described above, and hence removal of these components is not generally advantageous. However, it may be advantageous to remove a gravitational acceleration component, for example, following the procedure described above with respect to Equations 3-6 such that:

$$Vz_\Delta = Az_\Delta - Gz_\Delta \qquad \text{Equation 16}$$

$$Gz_\Delta = \frac{\pi}{15} Rtg|\cos(Inc)| \qquad \text{Equation 17}$$

where $Vz_\Delta$ represents the corrected axial vibration parameter, $Az_\Delta$ represents the axial vibration parameter, $Gz_\Delta$ represents the axial gravitational acceleration component, R represents the rotation rate of the sensor sub in units of RPM, t represents the predetermined measurement interval in units of seconds, g represents the gravitational acceleration of the earth, and Inc represents the borehole inclination. Note that axial gravitational acceleration component is maximum in a vertical well (zero degree inclination) and near zero in a horizontal well (90 degree inclination). The rotation rate of the sensor sub may be determined via simultaneous magnetometer measurements as described above.

The previously described magnetometer measurements may also be utilized to obtain a stick/slip parameter (a torsional vibration parameter), thereby enabling a full suite of dynamics measurements to be obtained using the navigational sensors (i.e., lateral vibration, axial vibration, and torsional vibration). Stick/slip is commonly quantified in the industry as a maximum drill string rotation rate minus a minimum drill string rotation rate within some predetermined time period. For the purposes of this disclosure, a stick/slip parameter may be quantified mathematically, for example, as follows:

$$SSN = \frac{\max\omega - \min\omega}{ave\omega} \qquad \text{Equation 18}$$

where SSN represents a normalized stick/slip parameter, maxω and minω represent maximum and minimum instantaneous angular velocities during some predetermined time period, and aveω represents the average angular velocity during the predetermine time period (e.g., 10 seconds). It will, of course, be appreciated that the stick/slip parameter SS need not be normalized as shown in Equation 16, but may instead be expressed simply as the difference between the maximum and minimum instantaneous rotation rates maxω and minω. In certain severe applications, stick/slip conditions can cause the drill string to temporarily stop rotating (i.e., such that: minω=0). In such applications, the stick/slip parameter is essentially equal to or proportional to the maximum instantaneous rotation rate maxω. As such, it will be understood that maxω may be a suitable alternative metric for quantifying stick/slip conditions. This alternative metric may be suitable for some drilling applications, especially since damage and wear to the drill bit and other BHA components is commonly understood to be related to the maximum instantaneous drill string rotation rate. The maximum instantaneous rotation rate may be computed downhole and transmitted to the surface where an operator may compare the value with the surface controlled (average) rotation rate.

The instantaneous rotation rate may be determined via magnetometer measurements, for example, as described above with respect to Equation 13. For example, the instantaneous rotation rate of the sensor sub may be computed via differentiating magnetic toolface measurements as follows:

$$\omega = \frac{\theta_m(n) - \theta_m(n-1)}{t} \qquad \text{Equation 19}$$

where ω represents the angular velocity of the sensor sub, $\theta_m$ represents the magnetic toolface, t represents the predetermined measurement interval, and n represents the array index in the set of magnetic toolface measurements such that $\theta_m(n-1)$ and $\theta_m(n)$ represent sequential magnetic toolface measurements. Therefore a stick slip parameter may be obtained, for example, via (i) rotating magnetic field sensors in the borehole, (ii) obtaining a plurality of magnetic field measurements at a predetermined measurement interval, (iii) processing the magnetic field measurements to obtain corresponding magnetic toolface measurements, (iv) differentiating the magnetic toolface measurements to obtain angular velocities, (v) alternatively integrate the differentiated toolface values to obtain sub-sampled angular velocities, and (vi) and processing the angular velocities to obtain the stick/slip parameter. The alternative integration step and sub-sampling step may enable a frequency dependence of the torsioanl vibration to be evaluated, e.g. a high-frequency torsional vibration severity (10-20 mS) and a low-frequency torsional vibration severity (100 mS~200 mS). In the embodiments described above, the original sampling rate is 100 samples per second. By integration, the differentiated data may be sub-sampled at substantially any other suitable frequency, for example, including 10 or 50 samples per second. The sub-sampled data may then be evaluated so as to monitor the vibration severities at predetermined frequencies.

Magnetic field measurements may be further utilized to correct accelerometer measurements for vibrational effects such that a corrected gravity toolface angle may be computed. For example, the corrected gravity toolface angle may be computed while drilling via: (i) rotating magnetic field sensors and accelerometers in a borehole, (ii) obtaining a plurality of magnetic field measurements and accelerometer measurements at a predetermined measurement interval while rotating (or drilling), (iii) processing the magnetic field measurements to obtain centripetal and/or tangential acceleration components (e.g., via Equations 10 and 13 as described above), (iv) subtracting at least one of the centripetal and tangential acceleration components from the corresponding accelerometer measurements to obtain corrected accelerometer measurements, and (v) utilizing the corrected accelerometer measurements to compute a corrected gravity toolface. Such corrected gravity toolface measurements may be utilized, for example, in LWD imaging tools.

It will be understood that the computed downhole dynamics parameters may be stored in downhole memory for subsequent surface analysis and/or transmitted to the surface during drilling to enable substantially real time mitigation as required. Those of ordinary skill will readily appreciate the potential benefits of transmitting the dynamics parameter(s) while drilling so that corrective measures (including changes to the drilling parameters) may be implemented if necessary. Due to the bandwidth constraints of conventional telemetry techniques (e.g., including mud pulse and mud siren telemetry techniques), each of the dynamics parameters may be reduced to a two-bit value (i.e., four levels; low, medium, high, and severe). Non-limiting encoding examples are shown in Table 1 for axial and lateral vibration parameters and Table 2 for a stick/slip parameter.

TABLE 1

| Axial and Lateral Vibration Parameter | | |
|---|---|---|
| Axial/Lateral Vibration | Level | Binary Representation |
| <1 G | Low | 00 |
| 1-2 G | Medium | 01 |
| 2-3 G | High | 10 |
| >3 G | Severe | 11 |

TABLE 2

| Normalized Stick/slip Parameter | | |
|---|---|---|
| Normalized Stick/slip | Level | Binary Representation |
| <50% | Low | 00 |
| 50-100% | Medium | 01 |
| 100-150% | High | 10 |
| >150% | Severe | 11 |

Figure 6:
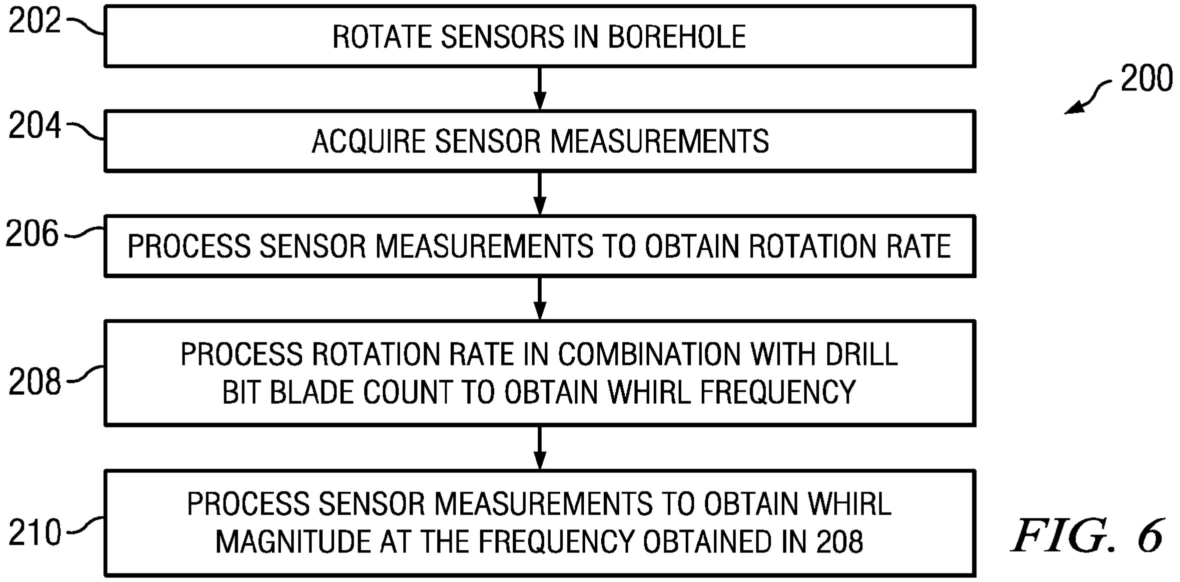

FIG. 6 depicts a flow chart of a method 200 for detecting and quantifying a whirl magnitude (such as a drill bit or stabilizer whirl magnitude) using rotating sensors. While the previous embodiments made use of navigational sensors, method 200 may make use of substantially any suitable sensor set in the drill string. The sensors may include, for example, cross-axial accelerometer and magnetometer sets deployed substantially anywhere in the drill string (e.g., just above the bit or further up the string). The sensors are rotated at 202, for example, while drilling the borehole (e.g., by rotating the drill string at the surface or rotating the drill bit with a conventional mud motor). As described above with respect to FIGS. 2 and 3, navigational sensors may include a tri-axial accelerometer set and a tri-axial magnetometer set, although the disclosed embodiments are not limited in this regard.

Sensor data is acquired at a predetermined time interval at 204 while rotating in 202 (e.g., during the actual drilling process) to obtain a set (or array) of sensor measurements. The sensor measurements may be made at a rapid interval so as to be sensitive to whirl (and other drill string vibrational modes as described above with respect to FIG. 4). The interval may be in the range from about 0.0001 to about 0.1 second (i.e., a measurement frequency in the range from about 10 to about 10,000 Hz). For example, in one embodiment a measurement interval of 10 milliseconds (0.01 second) may be successfully utilized.

The sensor measurements are processed at 206 to compute a rotation rate of the sensors (or a sensor sub or tool body in which the sensors are deployed). The instantaneous rotation rate of the sensors may be computed, for example, via differentiating magnetic toolface measurements as described above with respect to Equation 19. Gyroscopic (e.g., using solid state gyroscopic sensors) and accelerometer based methods for obtaining the rotation rate may also be utilized. The rotation rate of the sensors is then processed in combination with a predetermined blade count (e.g., a drill bit or stabilizer blade count) to compute a bit frequency at 208. The sensor measurements are then further processed at 210 to compute a whirl magnitude at the whirl frequency computed in 208. A severity of the whirl magnitude may then be classified and transmitted to the surface if so desired. The whirl magnitude and frequency may also be stored in downhole memory.

A bit whirl frequency (also referred to in the art as a backward whirl frequency) may be computed based on the number of blades in a PDC drill bit, for example, as follows:

$$\omega_{whirl}=\omega\cdot M=\omega\cdot(N+1) \qquad \text{Equation 20}$$

where $\omega_{whirl}$ represents the bit whirl frequency, ω represents the rotation frequency (or the instantaneous rotation frequency) of the sensor sub (or drill string), N represents the number of blades on the PDC drill bit, and M represents the number of lobes in the "star" whirl pattern (which is described in more detail below with respect to FIG. 7).

Upon acquiring a whirl frequency, the whirl magnitude may be computed from the accelerometer measurements. For example, a set of accelerometer measurements (e.g., a set of 1000 measurements obtained in a 10 second interval or a set of 10,000 measurements obtained in a 100 second interval) may be transformed from the time domain to the frequency domain. Suitable transforms include a Fourier Transform, a cosine transform, a sine transform, a polynomial transform, a Laplace transform, a Hartley transform, a wavelet transform, and the like. A transform may be selected, for example, in view of the ease with which it may be handled via a downhole processor. Cosine transforms (such as the DCT) may reduce downhole processing requirements in that they make use of only real-number coefficients (as opposed to complex coefficients). Fast transforms may also be utilized, for example, including a Fast Fourier Transform (FFT) or a Fast Cosine Transform (FCT). Such transforms are known to those of ordinary skill in the art and are commercially available, for example, via software such as MathCad® or Mathematica® (Wolfram Research, Inc., Champaign, Ill.), or MATLAB® (The Mathworks Inc.). Upon obtaining the transformed data set (the frequency domain data set), whirl may be quantified, for example, via obtaining the signal amplitude at the computed whirl frequency or by integrating the signal over some frequency range about the whirl frequency (e.g., within 1 Hz of the whirl frequency).

In an alternative methodology, a digital band pass filter may be applied to a set of accelerometer measurements (e.g., a set of 1000 measurements obtained in a 10 second interval or a set of 10,000 measurements obtained in a 100 second interval). The magnitude of the filtered data set may then be taken to be an indication of the whirl magnitude. The magnitude of the filtered data set may be expressed as a root mean square (RMS), for example, as follows:

$$x_{rms}=\sqrt{\frac{1}{n}(x_1^2+x_2^2+\ldots+x_n^2)} \qquad \text{Equation 21}$$

where $x_{rms}$ represents the root mean square of the filtered data set, n represents the number of accelerometer measurements in the data set, and $x_1, x_2, \ldots, x_n$ represent the filtered individual accelerometer measurements.

The digital band pass filter may include, for example, a filter having a center frequency about equal to the computed whirl frequency and a pass band of one or two Hertz about the center frequency. Suitable filters may include, for example, digital finite impulse response (FIR) and infinite impulse response (IIR) filters. Those of ordinary skill in the art will readily be able to design suitable digital band pass filters having substantially any suitable center frequency and pass band. Code for computing such filters is available, for example, from MATLAB® (The Mathworks Inc.).

A suitable digital filter may be computed uphole or downhole. For example, a downhole controller may be programmed with instructions for computing filter coefficients for a suitable digital filter based on the computed whirl frequency. Alternatively and/or additionally numerous filters (sets of filter coefficients) may be computed uphole and stored in downhole memory. These filters may be computed for each of a plurality of expected whirl frequencies within a predetermined range of frequencies. A suitable filter may then be obtained from memory based on the computed whirl frequency.

As with the dynamics parameters disclosed above, the whirl magnitude may also be stored in downhole memory for subsequent surface analysis and/or transmitted to the surface during drilling to enable substantially real time mitigation as required. Due to the aforementioned bandwidth constraints of conventional telemetry techniques, the whirl magnitude may be reduced, for example, to a one or two-bit value. A one bit value may indicate whether or not the magnitude exceeds some predetermined threshold. Two bits may indicate four magnitude levels, e.g., low, medium, high, and severe. The numerical value of the whirl magnitude may also be transmitted to the surface, e.g., as eight-bit or sixteen-bit floating point values. The whirl magnitude may also be normalized, for example, with respect to drill bit diameter or borehole inclination. Moreover, the whirl magnitude may also be combined with other dynamics measurements (e.g., the axial and lateral vibration and stick slip measurements described above) so as to obtain a combined parameter (e.g., a whirl/stick slip parameter, and so on).

A transmitted whirl magnitude (e.g., a bit whirl magnitude) may be used in an automated drilling routine. For example, the whirl magnitude and other dynamics parameters (such as stick slip) may be processed at the surface and used to automatically adjust one or more drilling parameters. These drilling parameters may include, for example, weight on bit (WOB), drill string rotation rate (RPM), and drilling fluid flow rate. In one automated embodiment a whirl magnitude received at the surface may be compared with a predetermined threshold. If the whirl magnitude is greater than the threshold and the WOB is less than some maximum value, then the WOB may be incrementally increased (e.g., by about 10%). If the whirl magnitude remains greater than the threshold and the RPM is greater than some minimum value, then the RPM may be incrementally decreased (e.g., by 10%). The routine may be continually repeated as long as desired. The routine may further process received stick slip values. For example, if the received stick slip is greater than a threshold and the WOB is greater than some minimum value, then the WOB may be incrementally decreased (e.g., by about 5%). If the stick slip remains greater than the threshold and the RPM is less than some maximum value, the RPM may then be incrementally increased (e.g., by 10%). By using these routines in combination the drilling parameters may be automatically maintained within a range of values that tends to minimize both whirl and stick slip.

It will of course be understood that the raw magnetometer and accelerometer data may be transmitted to the surface (e.g., using a wired drillpipe) and that the raw data may be processed at the surface according to any one or more of the various methods disclosed herein.

The various disclosed embodiments are now described in further detail by way of the following example, which is intended to be an example only and should not be construed as in any way limiting the scope of the claims. Sensor data was obtained using the methodology described above in a section of a borehole that was being drilling in a shale formation. The navigational sensors were deployed in a PathFinder® iPZIG® sensor sub deployed immediately above the bit that included conventional tri-axial accelerometers and tri-axial flux-gate magnetometers. The accelerometer configuration was similar to that depicted on FIG. 3. A conventional mud motor (having a bent housing) was deployed above the iPZIG® sensor sub. A conventional EM (electromagnetic) short-hop enabled two-way communication with other tools in a BHA (such as MWD and telemetry tools) across the motor. It will of course be understood that the disclosed embodiments are not limited to the use of a near-bit sensor sub, but are equally applicable to the MWD directional module deployed further away from the bit and/or other LWD imaging tools (gamma, density, neutron, caliper, resistivity imaging tools) including a directional sensor package.

FIGS. 7 and 8 depict plots of accelerometer and magnetometer data obtained during the aforementioned drilling operation. FIGS. 7A, 7B, 7C, and 7D (collectively FIG. 7) depict plots of the x- and y-axis accelerometer and magnetometer data obtained during the drilling operation. It will be understood that the x- and y-axes are transverse to the longitudinal axis of the drill string (also referred to as cross-axial) as described above with respect to FIGS. 2 and 3. FIG. 7A depicts a plot of the y-axis versus the x-axis accelerometer ($A_Y$ vs. $A_X$) values for each of 1000 data points acquired in a 10 second interval. The lobed "star" pattern indicative of bit whirl is readily apparent. In this particular example, the PDC drill bit included six blades and thus the star pattern includes seven lobes. A pattern recognition and/or image processing algorithm may be applied to the $A_Y$ vs. $A_X$ plot in order facilitate bit whirl identification. FIG. 7C depicts a plot of the y-axis versus the x-axis magnetometer ($B_Y$ vs. $B_X$) values. The circular pattern is indicative of rotary motion.

Figure 7A:
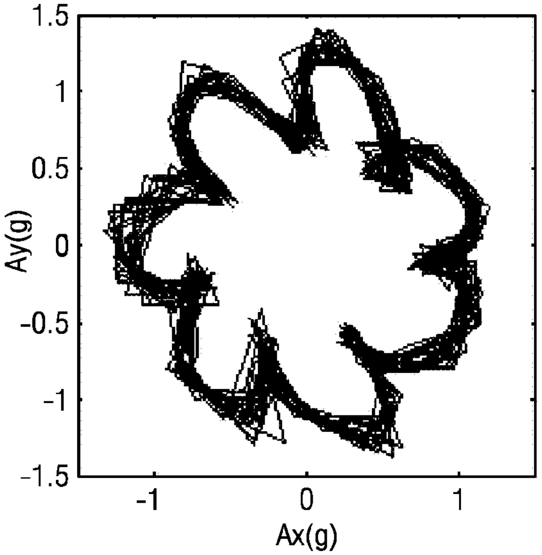
FIGS. 7A, 7B, 7C, and 7D (collectively FIG. 7) depict plots of x- and y-axis accelerometer and magnetometer data obtained during a downhole drilling operation.
Figure 7C:
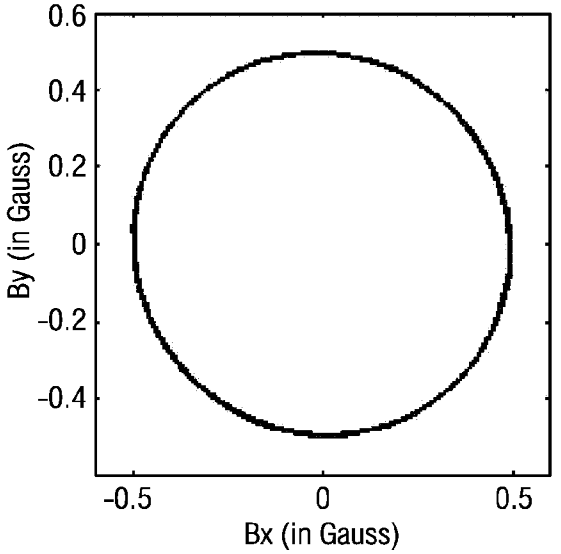
Figure 7B:
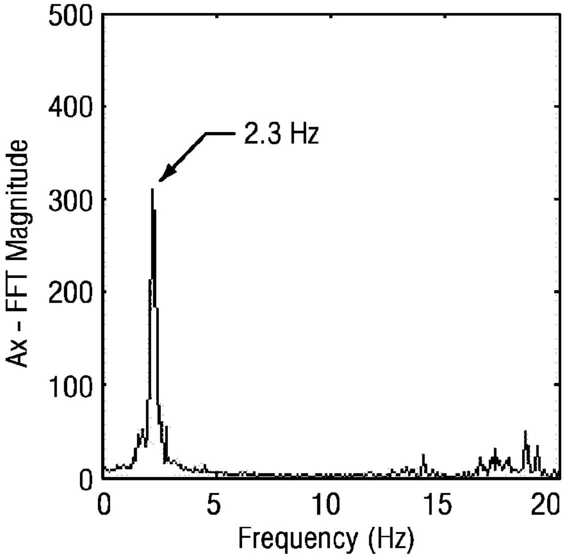
Figure 7D:
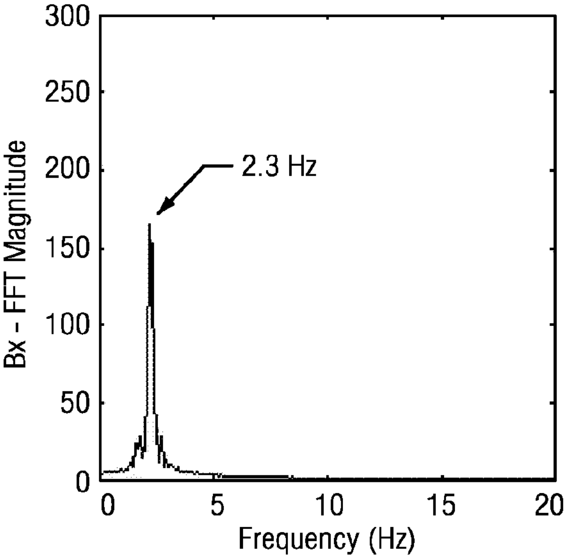

FIGS. 7B and 7D depict frequency spectra of plots of $A_X$ (FIG. 7B) and $B_X$ (FIG. 7D) from which the DC components have been removed. The peak in both spectra show the drill bit rotation frequency, which was about 2.3 Hz (138 rpm). It will thus be understood that obtaining a frequency spectrum of the accelerometer or magnetometer data is an alternative means for obtaining the rotation rate of the sensor sub at 206 of method 200 (FIG. 6).

FIGS. 8A, 8B, 8C, and 8D (collectively FIG. 8) depict plots of transverse (radial) accelerometer and magnetometer ($A_{XY}$ and $B_{XY}$) data obtained during a downhole drilling operation. The transverse (radial) accelerometer and magnetometer values were computed as follows:

$$A_{XY}=\sqrt{A_X^2+A_Y^2} \quad \text{Equation 22}$$

$$B_{XY}=\sqrt{B_X^2+B_Y^2} \quad \text{Equation 23}$$

Figure 8A:
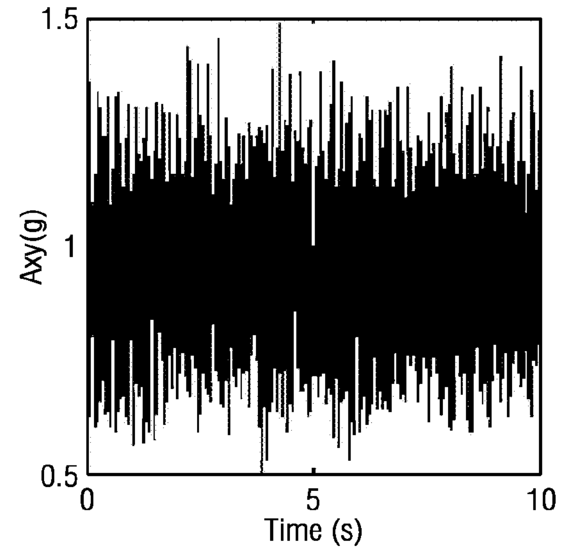
FIGS. 8A, 8B, 8C, and 8D (collectively FIG. 8) depict plots of transverse (xy) accelerometer and magnetometer data obtained during a downhole drilling operation.
Figure 8C:
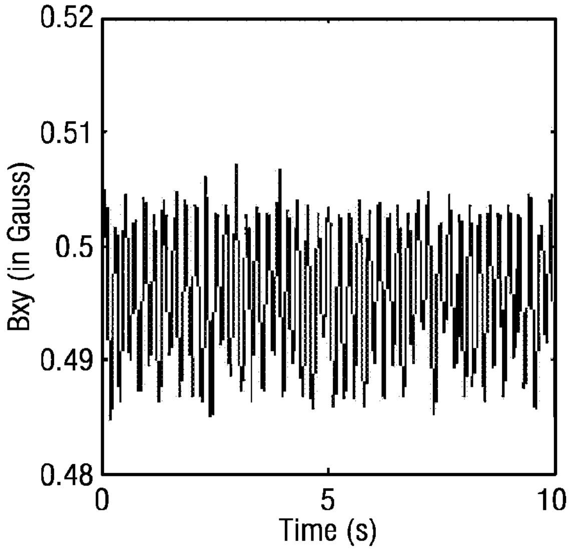
Figure 8B:
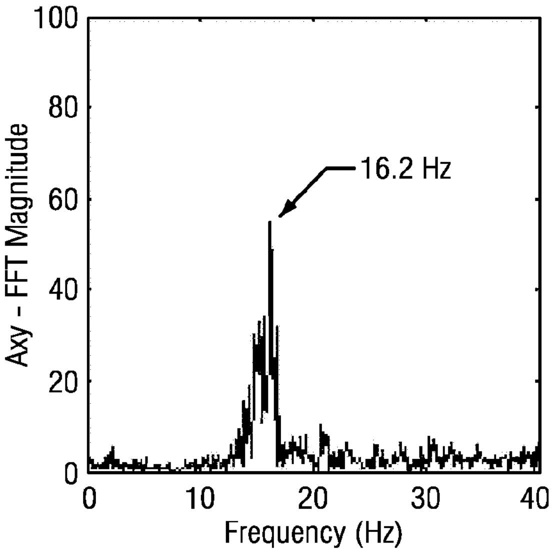
Figure 8D:
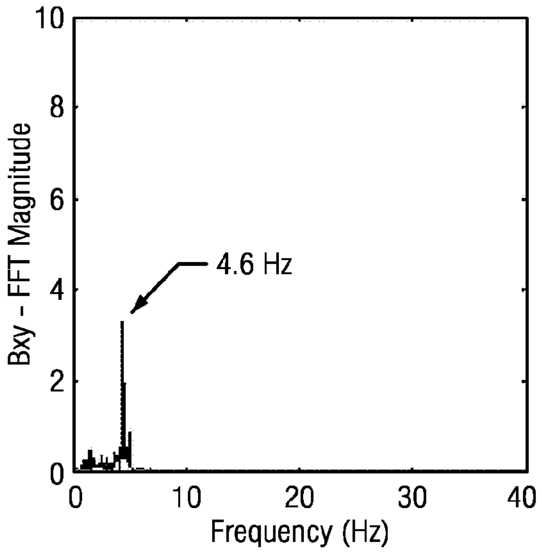

FIGS. 8A and 8C depict plots of $A_{XY}$ and $B_{XY}$ versus time for the 10 second interval over which the sensor measurement were acquired. FIGS. 8B and 8D depict frequency spectra for the time domain plots of $A_{XY}$ and $B_{XY}$ shown FIGS. 8A and 8C. The DC component of the $A_{XY}$ and $B_{XY}$ spectra has been removed. The $A_{XY}$ spectrum depicted on FIG. 8B shows a clear and strong peak at the bit whirl frequency of 16.2 Hz (the rotation frequency 2.3 Hz times the 7 lobes). The $B_{XY}$ spectrum depicted on FIG. 8D shows a peak at 4.6 Hz (the second harmonic of the 2.3 Hz rotation frequency). The small peak at the fundamental rotation frequency (2.3 Hz) may be taken to be indicative of the drill string rotation being smooth (nearly constant) in the 10 second interval over which the sensor data was acquired. It will be understood that since AC signals are used to detect the whirl frequency, AC coupled accelerometers and/or magnetometers may be used in whirl detection.

While the example described above makes use of x- and y-axis accelerometer measurements to compute $A_{XY}$, it will be understood that the disclosed embodiments are so limited. In an alternative embodiment a single radially oriented accelerometer to directly measure $A_{XY}$. The $A_{XY}$ spectrum may then be obtained by transforming the radial sensor data into the frequency domain as described above.

It will be understood that while not shown in FIGS. 1, 2, and 3, bottom hole assemblies suitable for use the disclosed embodiments generally include at least one electronic controller. Such a controller may include signal processing circuitry including a digital processor (a microprocessor), an analog to digital converter, and processor readable memory. The controller may also include processor-readable or computer-readable program code embodying logic, including instructions for computing vibrational parameters as described above, for example, in Equations 1-19. One skilled in the art will also readily recognize that the above mentioned equations may also be solved using hardware mechanisms (e.g., including analog or digital circuits).

A suitable controller may further include a timer including, for example, an incrementing counter, a decrementing time-out counter, or a real-time clock. The controller may further include multiple data storage devices, various sensors, other controllable components, a power supply, and the like. The controller may also optionally communicate with other instruments in the drill string, such as telemetry systems that communicate with the surface or an EM (electro-magnetic) shorthop that enables the two-way communication across a downhole motor. It will be appreciated that the controller is not necessarily located in the sensor sub (e.g., sub 60), but may be disposed elsewhere in the drill string in electronic communication therewith. Moreover, one skilled in the art will readily recognize that the multiple functions described above may be distributed among a number of electronic devices (controllers).

Although downhole dynamics measurements using navigational sensors and certain advantages thereof have been described in detail, it should be understood that various changes, substitutions and alternations can be made herein without departing from the spirit and scope of the disclosure as defined by the appended claims.

What is claimed is:

1. A method for making downhole whirl measurements while drilling a subterranean borehole, the method comprising:

(a) deploying a drill string in the subterranean borehole, the drill string including a drill bit and a sensor set, the sensor set including at least one cross-axial accelerometer and at least one cross-axial magnetometer;

(b) rotating the drill string in the borehole such that the drill bit drills the borehole and the sensor set rotates and accelerates in the borehole;

(c) causing the at least one cross-axial accelerometer to make a plurality of acceleration measurements at predetermined measurement intervals while rotating the drill string in act (b);

(d) causing the at least one cross-axial magnetometer to make a plurality of magnetic field measurements at predetermined measurement intervals while rotating the drill string in act (b);

(e) processing the plurality of acceleration measurements made in act (c) and/or the plurality of magnetic field measurements made in act (d) to compute a rotation frequency of the drill string in act (b);

(f) multiplying the rotation frequency of the drill string computed in act (e) by (N+1) to compute a whirl frequency, wherein N represents a number of blades on the drill bit;

(g) processing the plurality of acceleration measurements made in act (c) to compute a whirl magnitude of the drill bit at the whirl frequency computed in act (f); and (h) adjusting at least one drilling parameter based on the whirl magnitude of the drill bit, wherein the at least one drilling parameter is selected from the group consisting of weight on bit, drill string rotation rate, and drilling fluid flow rate.

2. The method of claim 1, wherein said processing in act (g) further comprises applying a digital band pass filter to the plurality of acceleration measurements made in act (c), the band pass filter having a center frequency substantially equal to the whirl frequency computed in act (f).

3. The method of claim 1, wherein said processing in act (g) further comprises transforming the plurality of acceleration measurements made in act (c) to a frequency domain and obtaining a signal amplitude of said transformed accelerometer measurements at a frequency substantially equal to the whirl frequency computed in act (f).

4. The method of claim 1, wherein said processing in act (e)-further comprises differentiating the plurality of magnetic field measurements made in act (d) to obtain the rotation frequency of the drill string.

5. The method of claim 1, further comprising:

(i) transmitting the whirl magnitude to a surface location; and (j) processing the whirl magnitude at the surface location to automatically adjust the at least one drilling parameter.

6. A method for making downhole whirl measurements while drilling a subterranean borehole, the method comprising:

(a) deploying a drill string in the subterranean borehole, the drill string including a drill bit and a navigational sensor set, the navigational sensor set including at least a tri-axial accelerometer set and a tri-axial magnetometer set;

(b) rotating the drill string in the borehole such that the drill bit drills the borehole and the navigational sensor set rotates and accelerates in the borehole;

(c) causing the tri-axial accelerometer set to make a plurality of acceleration measurements at predetermined measurement intervals while rotating in act (b);

(d) causing the tri-axial magnetometer set to make a plurality of magnetic field measurements at predetermined measurement intervals while rotating in act (b);

(e) processing the plurality of acceleration measurements made in act (c) and/or the plurality of magnetic field measurements made in act (d) to compute a rotation frequency of the drill string in act (b);

(f) computing a bit whirl frequency according to the following equation: $\omega_{whirl}=\omega\cdot(N+1)$; wherein $\omega_{whirl}$ represents the bit whirl frequency, $\omega$ represents the rotational frequency of the drill string computed in act (e), and N represents number of blades on the drill bit;

(g) processing the plurality of acceleration measurements made in act (c) to compute a whirl magnitude of the drill bit at the whirl frequency computed in act (f); and (h) adjusting at least one drilling parameter based on the whirl magnitude of the drill bit, wherein the at least one drilling parameter is selected from the group consisting of weight on bit, drill string rotation rate, and drilling fluid flow rate.

7. The method of claim 6, wherein said processing in act (g) further comprises applying a digital band pass filter to the plurality of acceleration measurements made in act (c), the band pass filter having a center frequency substantially equal to the whirl frequency computed in act (f).

8. The method of claim 7, wherein the digital band pass filter is computed downhole based upon the bit whirl frequency computed in act (f).

9. The method of claim 7, wherein the digital band pass filter is selected from tool memory based upon the bit whirl frequency computed in act (f).

10. The method of claim 6, wherein said processing in act (g) further comprises transforming the plurality of acceleration measurements made in act (c) to a frequency domain and obtaining a signal amplitude of said transformed accelerometer measurements at a frequency substantially equal to the whirl frequency computed in act (f).

11. The method of claim 10, wherein the plurality of acceleration measurements are transformed to the frequency domain using a Fast Fourier Transform.

12. The method of claim 6, wherein said processing in act (e) further comprises differentiating the plurality of magnetic field measurements made in act (d) to obtain the rotation frequency of the drill string.

13. The method of claim 6, wherein the navigational sensor set is deployed in the drill string within two meters of the drill bit.

14. The method of claim 6, wherein the predetermined measurement interval is in the range from about 0.0001 to about 0.1 second.

15. The method of claim 6, further comprising:

(i) transmitting the bit whirl magnitude to a surface location.

16. The method of claim 15, further comprising:

(j) processing the whirl magnitude at the surface location to automatically adjust the at least one drilling parameter.

17. The method of claim 16, wherein act (j) further comprises processing a stick/slip measurement to automatically adjust the at least one drilling parameter.

* * * * *